United States Patent Office 3,523,447
Patented Aug. 11, 1970

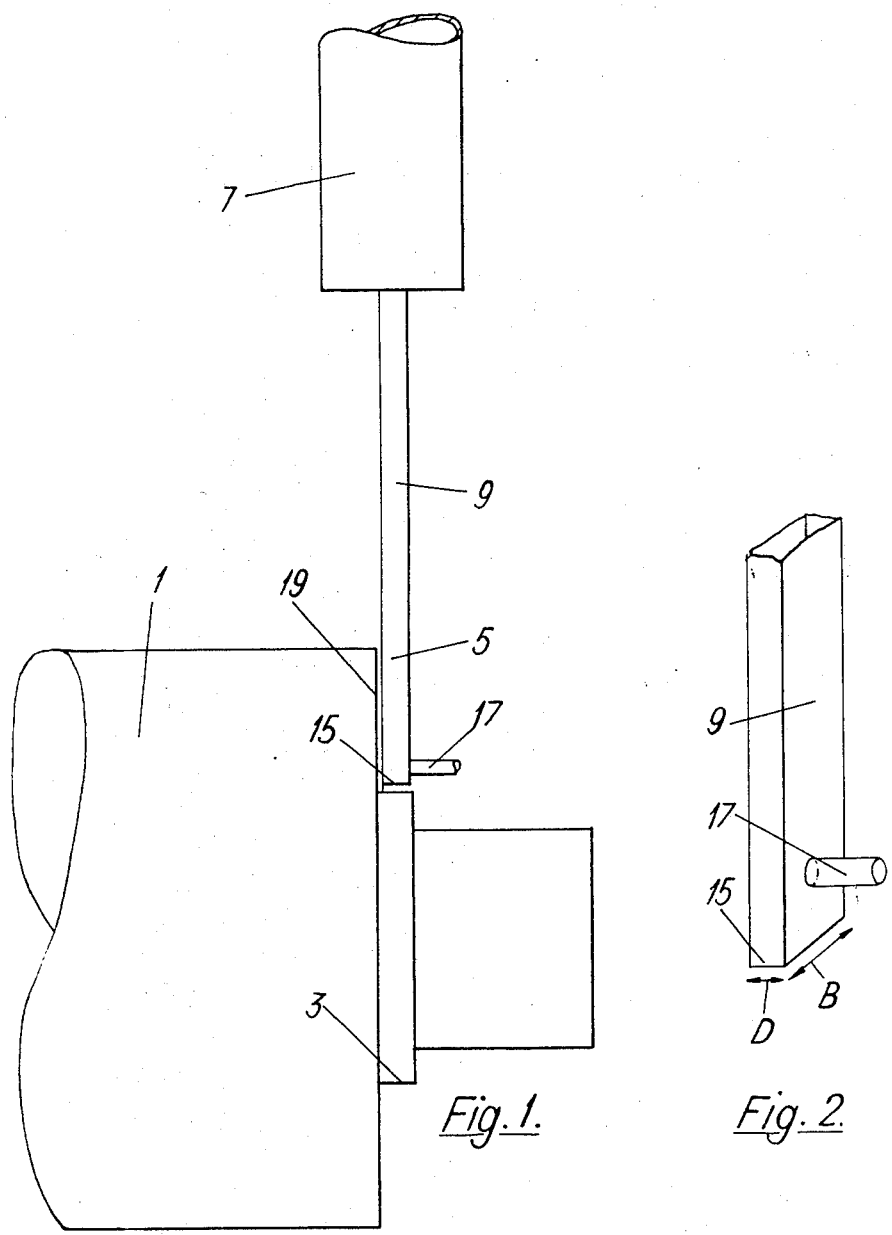

3,523,447
PROXIMITY GAUGES
Royds Sharp, Busby, Glasgow, Malcolm Bath, East Kilbride, Glasgow, and David Brown, High Blantyre, Glasgow, Scotland, assignors to National Research Development Corporation, London, England, a British corporation
Filed May 9, 1968, Ser. No. 728,256
Claims priority, application Great Britain, May 15, 1967, 22,498/67
Int. Cl. G01b *13/12*
U.S. Cl. 73—37.5                    8 Claims

ABSTRACT OF THE DISCLOSURE

A proximity gauge is described in which a compressed fluid is directed through an open-ended tube of rectangular internal cross-section onto a surface to be tested. The "back pressure" at a predetermined point in the tube is measured to give an indication of the spacing between the open end of the tube and the surface to be tested. The gauge has a sharp response to variations in the spacing and is particularly useful for gauging narrow shoulders on workpieces.

---

This invention relates to proximity gauges in which fluid under pressure is either blown or sucked through an open end of a conduit which is located near a surface a parameter of which is to be ascertained, the pressure in the conduit being functionally related to the distance between the said end of the conduit and the surface over a working range of distances.

Proximity gauges may be used in several ways: they may be used to indicate when a surface is approaching a given position, and the indication used, for example, to stop continued movement of the surface; they may be used to indicate clearance between the end of the conduit and a workpiece, for example in the mechanised checking of a machined component for size; and they may be used in the measurement of the dimensions of a body, for example the internal diameter of a cylinder.

According to one aspect of the present invention there is provided a proximity gauge including a conduit having an open end which may be spaced from a surface to be gauged, means for supplying fluid under pressure to said conduit to direct fluid onto said surface through said open end, and pressure responsive means for ascertaining the pressure in said conduit, at least the terminal part of said conduit, which terminal part includes said open end, being of substantially rectangular internal cross-section and the shorter sides of the set terminal part having a length in the range of substantially 0.005 to 0.030 inch.

Preferably, the ratio of the lengths of the sides of the said terminal part is substantially 2:1.

It is found that advantages are given by the use of a conduit which has such relatively small dimensions at its discharge end, for example a conduit of internal cross-sectional area of about $700 \times 10^{-6}$ sq. in. The discharge from such a small terminal part of the conduit is directed towards only a very small part of the surface to be measured. This renders the proximity gauge more accurate, since the pressure indication is then relatively unaffected by curvature of the surface, rendering proximity gauges suitable for gauging e.g. the curved surface of a gear wheel tooth. Moreover, when using the proximity gauge for accurately measuring dimensions of a workpiece having a shoulder, it is necessary to get close to the shoulder. A rectangular cross-section for the conduit is more advantageous than e.g. a round bore or capillary conduit, since the latter has relatively poor output pressure characteristics and a limited linear range, when gauging a shoulder. Furthermore, by providing the conduit with thin walls, the pressure pick-up point may be brought closer to the end of the gauge, thus improving the performance characteristics of the gauge by reducing the standing pressure.

The terminal part of said conduit may be formed in an end face of a block so as to have one longitudinally extending side open and said side being covered by a cover member which is readily detachably secured to said block. Said cover member is preferably a thin sheet-like member. Advantageously, said edge is arcuate in profile.

Preferably, said block is substantially wedge-shaped in a cross-section taken at right angles to said end face.

In an alternative arrangement, said end face may be substantially planar throughout and is arranged in operation to extend at an acute angle to the surface to be gauged. Said cover member preferably has a face of the same shape as said end face to define said conduit therebetween, and the opposite face thereof is provided with a chisel-like portion in the region of said terminal part, whereby the thickness of said cover member in said region is reduced.

According to another aspect of the present invention, there is provided a method of gauging a surface comprising passing fluid under pressure through a conduit having at least a terminal part of substantially rectangular internal cross-section, directing said fluid onto said surface from an open end of the conduit which open end is located in said terminal part and is spaced from said surface, and providing an indication of the fluid pressure prevailing in said conduit, said fluid pressure being a function of the spacing between said open end and said surface.

The invention will now be described, by way of example, with reference to the accompanying drawings, in which:

FIG. 1 is a diagrammatic side elevation of a workpiece and of a pneumatic proximity gauge for gauging a surface of that workpiece;

FIG. 2 is a perspective view of a terminal part of a conduit of the proximity gauge shown in FIG. 1;

Figure 3:
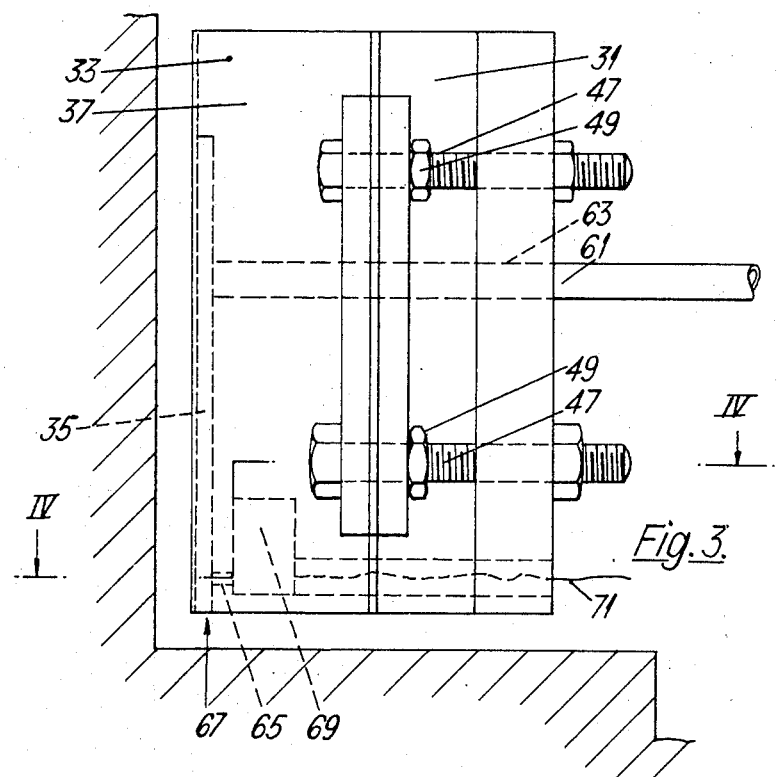
FIG. 3 is a side elevation, partly in section, of a second embodiment of a proximity gauge according to the present invention drawn to a larger scale than FIG. 1.

Referring first to FIGS. 1 and 2, there is shown a proximity gauge generally indicated at 5 and used for gauging a workpiece 1 of circular cross-section and formed with a narrow shoulder 3 the radius of which is to be measured by means of the proximity gauge 5. The gauge 5 is in the form of a compressed air supply conduit or duct 7 of circular cross-section and relatively larger diameter terminating in a relatively small duct 9 of substantially rectangular cross-section. Adjacent the discharge end 15 the duct 9 is provided with an output conduit 17 in which is located a suitable means (not shown in FIGS. 1 and 2) for ascertaining the pressure prevailing in the output conduit 17. As is well-known, this pressure is functionally related to the spacing of the discharge end 15 and the surface of the shoulder 3 of workpiece 1.

Gauges wherein the duct 9 has a depth D of 0.015 inch and a breadth B of 0.030 inch (see FIG. 2) have been found to give satisfactory results. However, it has been found that the minimum depth D of the cross-section of duct 9 (referred to hereinafter as the slot) used in practice is about 0.005 inch and the maximum depth D used in practice is about 0.30 inch. For a given value of D within the limits stated, it may be found that slots wherein the breadth B is greater than, and preferably twice the depth D give the most improved performance characteristics.

In use the discharge end 15 of the duct 9 is positioned close to the surface of shoulder 3 the position of which is to be gauged, and the pressure in an output conduit 17 indicates the clearance between the discharge end 15 and the said surface.

If the gauge 5 is to be used close up to abutments, for example close to the radially extending shoulder 19, the duct 9 must have a very thin wall. Furthermore, it is necessary to be able readily to clean the duct, since any fouling of the duct will affect the pressure produced in the output conduit 17.

Figure 4:
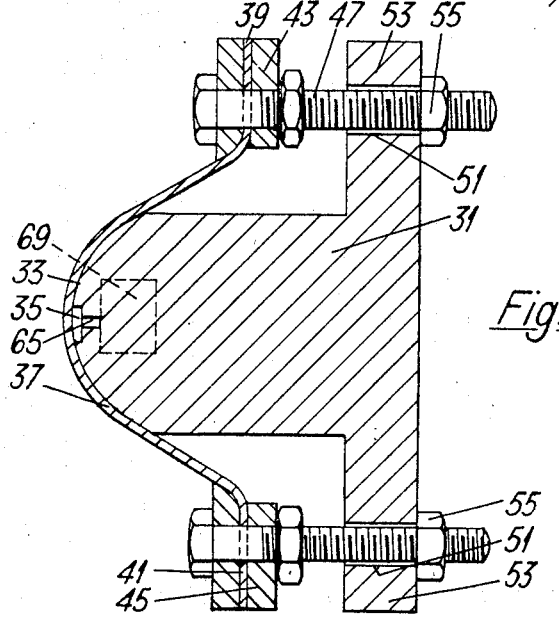
FIG. 4 is a sectional plan view taken on the line IV—IV of FIG. 3.

Referring now to the embodiment of the invention shown in FIGS. 3 and 4, there is shown a metal block 31 having one edge or end face 33 radiused to have an arcuate profile as shown in FIG. 4, and having this edge formed with a slot 35 which extends along the center of the curved part of the block from one end thereof, but terminates short of its other end. This slot 35 is covered by a thin metal sheet 37, having a thickness of 0.002 inch, which is wrapped over the radiused edge 33 and its two ends 39 and 41 are held by clamps 43, 45. Each clamp 43, 45 consists of a pair of suitably shaped plates held together by two bolts 47 carrying nuts 49. These two bolts 47 extend through clearance holes 51 in flanges 53 provided on the block 31 and carry tightening nuts 55 beyond the flanges 53. It will be seen that by first clamping the metal sheet 37 to the bolts 47 and then tightening the nuts 55, the metal sheet 37 effectively closes the outer side of the slot 35.

Air is supplied under pressure from a source (not shown) to the slot 35 through a pipe 61 and a duct 63 drilled in the block 31 and aligned with the pipe 61. A small bore 65 serving as an output conduit is drilled in the floor of the slot 35 near its discharge end 67 and communicates with an electromechanical transducer 69 connected by an electrical lead 71 to an electrical circuit (not shown) by which, in operation, the output of the transducer is measured and thus a measure of the pressure in the slot 35 is provided.

Clearly the clamp arrangement for the sheet 37 is readily detachable and thus the entire length of the slot 35 is readily freed for cleaning the slot, whenever necessary.

It will be seen that with the construction of FIGS. 3 and 4 the transducer has a very small overhang to one side of the discharge end 67 of the slot 35, and this enables the transducer 69 to be used to measure the position of very narrow shoulders on workpieces. Further, the transducer 69 itself is very easily demountable for cleaning.

Figure 5:
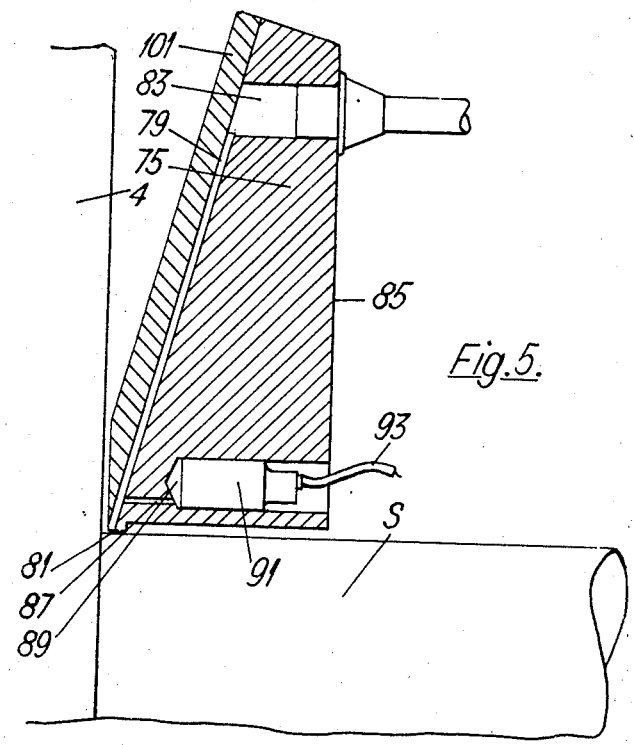
FIG. 5 is a side elevation, partly in section, of a third embodiment of a proximity gauge according to the present invention.
Figure 6:
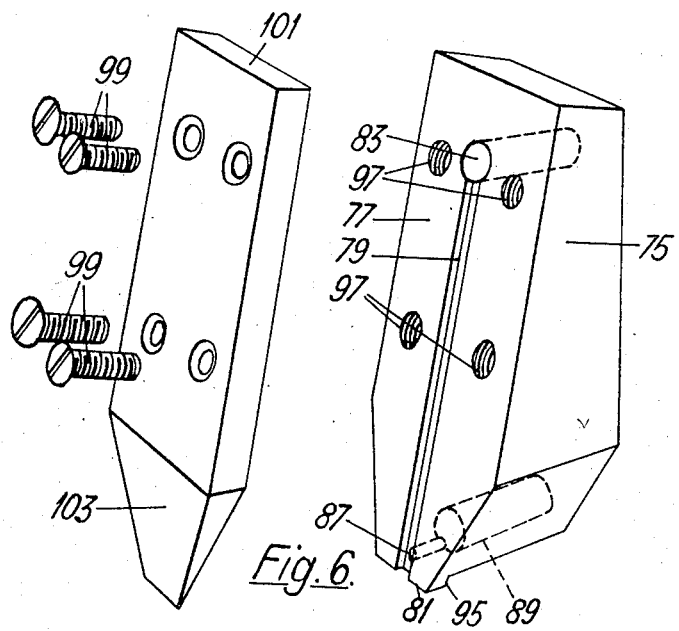
FIG. 6 is an exploded view of the proximity gauge illustrated in FIG. 5.

The embodiment of the invention illustrated in FIGS. 5 and 6 comprises a body 75 having a planar first face 77 in which is formed a slot 79 of substantially rectangular cross-section extending from a discharge end 81 of the body 75 to a bore 83 extending through the body from the first face 77 to an opposite second face 85. The second face 85 is inclined to the first face 77 in such a manner that the body 75 is thicker at the end 81 of the body 75 to give the latter a wedge-shaped profile.

A further bore 87 extends from the floor of the slot 79 to a larged diameter counterbore 89 in which is located a pressure transducer 91 from which extend electrical leads 93. The end of the bore 87 in the floor of the slot 79 is located closely adjacent the end 81 of the body 75.

As can be seen in FIG. 6, the end 81 of the body is of blunt-ended wedge shape when viewed in a direction normal to the plane of the face 77.

The end 81 of the body is provided with a lip 95 which is contiguous with the surface 77 and extends to each side of the slot 79.

The body 75 is provided with threaded bores 97 for receiving screws 99 for retaining a thin cover plate 101 on the face 77 of the body. The cover plate 101 has the same profile as the face 77 of the body 75 and is of chisel form at its end 103 overlying the end 81 of the body 75.

The cover plate 101 serves to close the slot 79 so that a passage of rectangular cross-section is formed which is open at the end 81 of the body 75, and which extends at an acute angle to a surface S to gauged.

The bore 83 is connectable to a source (not shown) of compressed air to supply the rectangular cross-section passage therewith. The bore 87 serves as an output conduit to place the pressure transducer 91 in communication with the rectangular cross-section passage close adjacent its open, sensing end.

The end 103 of the cover plate 101 is of reduced thickness or chisel form so that the rectangular cross-section passage may be brought very close to a shoulder as may be seen in FIG. 5. The thickness of the cover plate 101 at its end 103 may be as small as 0.002 inch.

As in the embodiment illustrated in FIGS. 3 and 4, the embodiment illustrated in FIGS. 5 and 6 is easily disassembled to allow cleaning of the bores and slot formed in the body.

We claim:

1. A proximity gauge including a conduit having a terminal part including an open end which may be spaced from a surface to be gauged, means for supplying fluid under pressure to said conduit to direct fluid on to said surface through said open end, and pressure responsive means for ascertaining the pressure in said conduit, at least the said terminal part of said conduit being of substantially rectangular internal cross-section, the shorter sides of the said terminal part having a length in the range of substantially 0.005 to 0.030 inch.

2. A gauge as claimed in claim 1 wherein the ratio of the lengths of the sides of the said terminal part is substantially 2:1.

3. A gauge as claimed in claim 1 wherein there is provided a block, at least the said terminal part being formed in an end face of said block so as to have one longitudinally extending side open, and a cover member which is readily detachably secured to said block so as to cover said side.

4. A gauge as claimed in claim 3 wherein said cover member is a thin sheet-like member.

5. A gauge as claimed in claim 3 wherein said end face is arcuate in profile.

6. A gauge as claimed in claim 3 wherein said block is substantially wedge-shaped in a cross-section taken at right angles to said end face.

7. A gauge as claimed in claim 6 wherein said end face is substantially planar throughout and is arranged in operation to extend at an acute angle to the surface to be gauged.

8. A gauge as claimed in claim 6 wherein said cover member has a face of the same shape as said end face to define said conduit therebetween, and the opposite face thereof is provided with a chisel-like portion in the region of said terminal part, whereby the thickness of said cover member in said region is reduced.

References Cited

UNITED STATES PATENTS

| | | | |
|---|---|---|---|
| 2,497,236 | 2/1950 | Polk | 73—37.5 |
| 3,194,055 | 7/1965 | Knobel | 73—37.7 |
| 2,846,871 | 8/1958 | Worthen | 73—37.9 |
| 3,127,764 | 4/1964 | Hudson | 73—37.5 |

LOUIS R. PRINCE, Primary Examiner

W. A. HENRY II, Assistant Examiner